United States Patent [19]
Anagnostopoulos et al.

[11] 3,929,012
[45] Dec. 30, 1975

[54] METHOD AND APPARATUS FOR OPTIMIZING CURE TIME OF ELASTOMERIC ARTICLES

[75] Inventors: Constantine E. Anagnostopoulos, St. Louis, Mo.; Raleigh W. Wise, Akron, Ohio

[73] Assignee: Monsanto Company, St. Louis, Mo.

[22] Filed: July 7, 1972

[21] Appl. No.: 269,859

Related U.S. Application Data
[63] Continuation of Ser. No. 791,031, Jan. 14, 1969.

[52] U.S. Cl. ................................ 73/156; 73/101
[51] Int. Cl. ........................................ G01n 3/32
[58] Field of Search ...................... 73/15.6, 101

[56] References Cited
UNITED STATES PATENTS

| | | |
|---|---|---|
| 3,182,494 | 5/1965 | Beatty et al. ........................ 73/101 |
| 3,188,853 | 6/1965 | Rosa et al. ............................. 73/15 |
| 3,494,172 | 2/1970 | Juve et al. ............................ 83/101 |

FOREIGN PATENTS OR APPLICATIONS

| | | |
|---|---|---|
| 1,531,572 | 7/1968 | France ................................... 73/15 |

OTHER PUBLICATIONS

Paschkis "A Study of Curing Tires in Rubber Age," Vol. 69, No. 1, Apr. 51, pp. 45–50.

*Primary Examiner*—Herbert Goldstein

[57] ABSTRACT

Method and apparatus for determining the state of cure of an elastomeric article within a mold wherein a probe is embedded in the article, the energy required to move the probe in a determined mode is measured, and the energy measurement is related to the state of cure of the article.

2 Claims, 4 Drawing Figures

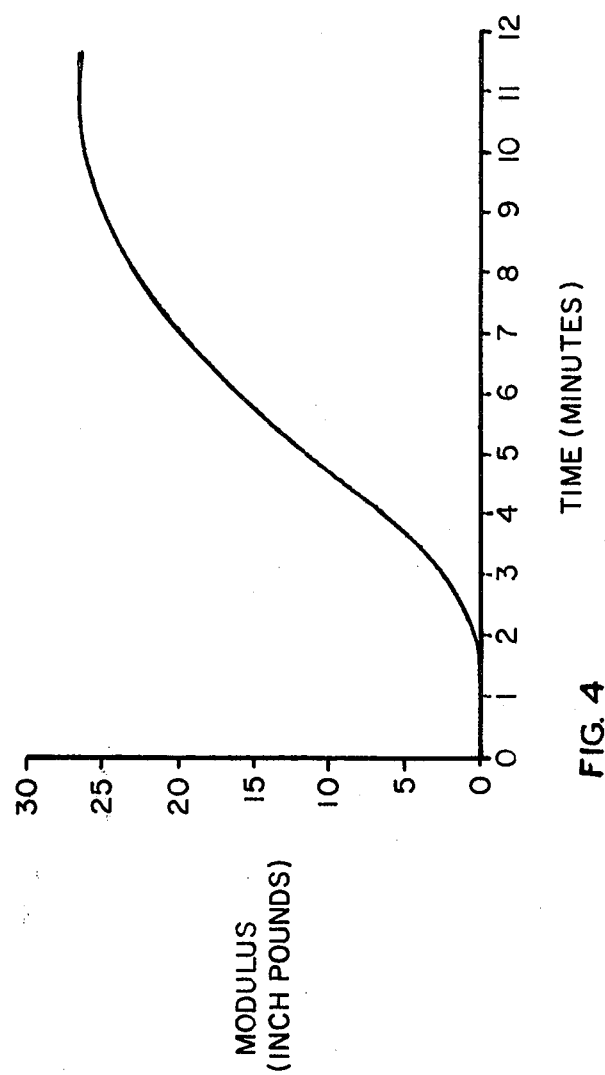

METHOD AND APPARATUS FOR OPTIMIZING CURE TIME OF ELASTOMERIC ARTICLES

This is a continuation of application Ser. No. 791,031 filed Jan. 14, 1969.

This invention relates to testing devices and, more specifically, it pertains to a method and apparatus for determining the optimum cure time of elastomeric articles.

The term "curing" is used herein to denote any process which converts an essentially plastic compounded material to an essentially elastomeric state. There are numerous conditions under which curing can be carried out, e.g., mold curing, steam curing, hydraulic curing, air curing and the like. The compounded material can be synthetic, natural, or a combination thereof.

In the curing of elastomeric articles it is necessary to determine the amount of curing time which is required to obtain optimum physical properties in the finished product. In the case of rubber articles, for example, it is customary to carry out the curing process for a predetermined time at a predetermined temperature. Because rubber is a poor heat conductor, however, there is a significant time lag between the temperature in the center of a thick article and that on the outside. Thus during the curing cycle of thick rubber articles such as vehicle tires, the insulating properties of the rubber can create widely divergent temperatures between the different sections of the tire.

The problem of determining optimum curing conditions for thick rubber sections, therefore, is related to the poor thermal conductivity of the rubber. Mold temperatures which are adequate to give reasonable cure times for thick cross sections of rubber usually result in overcuring of the rubber adjacent to the mold and undercuring for the rubber farthest from the mold. This is somewhat compensated for by the fact that rubber in the center of the article cools slower than that on the outside of the article and curing continues after the article is removed from the mold. Such post-curing, after pressure is reduced when the mold is opened, can lead to inferior quality in the finished product. The problem is further complicated in the curing of elastomeric articles such as tires which can contain more than one rubber compound each of which cures at a different rate.

In addition to the thermal problems mentioned above, significant variations can occur from batch to batch in the preparation of the compounded rubber or other elastomeric substance. Furthermore, there can be variations in heat transfer characteristics between different molds employed for curing of the same type article.

Efforts have been made to overcome the effects of the many variables which are inherent in the manufacture of elastomeric articles. The prior art discloses numerous sampling techniques whereby specimens can be tested to determine physical characteristics at various stages of cure. Alternatively, a temperature-time history of a thick elastomeric article can be charted by measuring the temperature of various sections of the article during a curing cycle. The theoretical state of cure with time for such variable conditions can be predicted using the temperature coefficient of vulcanization as calculated from isothermal cure data obtained for the same compound. In the absence of any reasonable calculation, a specimen of the article may be cured and its state of cure examined to determine whether a time adjustment upward or downward is required.

Through the outstanding achievements of the present invention, it is now possible to adjust the cure time of each manufactured article to the optimum rather than to depend upon a predetermined fixed cure time. By permitting each article to attain its optimum cure, therefore, the desired physical properties of the finished product are enhanced. Many of the variations which are inherent in the manufacturing or vulcanizing process are thus compensated for.

It is an object of the present invention, therefore, to provide a method and apparatus for determining when an elastomeric article reaches an optimum state of cure during its processing, whether it be vulcanization or some other process.

Another object of the present invention is to provide means for monitoring the modulus or stiffness of a portion of an elastomeric article throughout the curing cycle.

Still another object of the present invention is to provide a cure time optimizer which senses the modulus of the article itself rather than that of a sample material.

Yet another object of the present invention is to provide a modulus sensing apparatus adaptable to curing molds.

Other objects, aspects and advantages of the present invention will become apparent from a consideration of the accompanying disclosure, drawing and claims.

In the drawing:

FIG. 4 is a curve of rubber modulus vs. time obtained during curing of a rubber article using the apparatus of FIG. 1.

Figure 1:
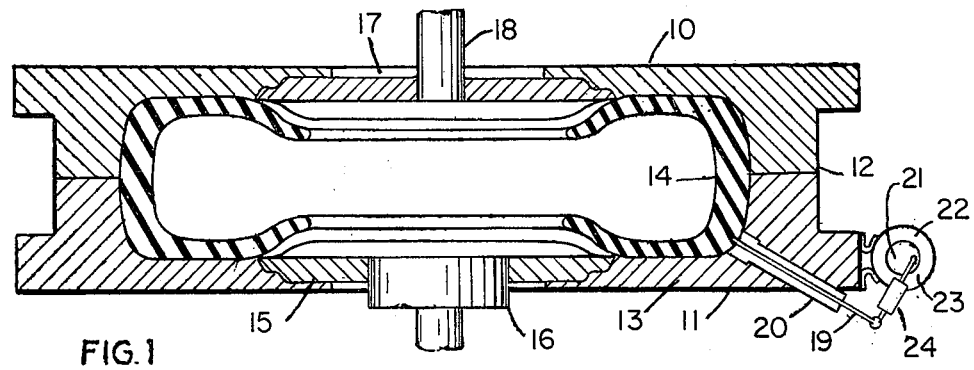
FIG. 1 is a vertical section view of a tire mold showing one embodiment of the sensing system of the present invention adapted thereto.

With reference to FIG. 1 of the drawing, a curing mold for vehicle tires is shown in section view, along with an embodiment of the modulus sensing apparatus of the present invention. The mold body is composed of two main components, viz., upper mold member 10 and lower mold member 11. The matching surfaces of mold members 10 and 11 define a cavity of the desired shape for the article to be cured within the mold. Concentricity between the mold members is maintained by the wedging action of surface 12. Heat is supplied to mold members 10 and 11 during the curing process. There are numerous ways of supplying this heat, e.g., by conduction from steamheated platens that are forced by hydraulic pressure to close the mold. With continued reference to FIG. 1, the tire is indicated by reference numeral 13. Lining the inside surface of tire 13 is bladder 14, a member which imparts the desired contour to tire 13 during the curing process. Bladder 14 is secured on the lower side by the interaction of annular retainer 17 and upper mold guide member 16. To shorten the curing period and to promote uniformity of heat to the tire, it is customary to introduce steam or some other heat transfer fluid to the annular volume within bladder 14.

The modification to the mold of FIG. 1 which represents a teaching of the present invention is the provision of a self-contained modulus sensing apparatus. More specifically, FIG. 1 illustrates one means of adapting a paddle type sensor for determining the state of cure of a tire in a tire mold. Probe 19 is disposed within a diagonal passage in lower mold member 11. The tip of probe 19 penetrates into the elastomeric material comprising the tire. Location of probe 19 within the mold is afforded by probe adapter 20 which is retained by means of a press fit or by a pin or setscrew arrangement. Oscillation of probe 19 is caused by eccentric 21 which is driven by electric motor 22 and cooperates with connecting link 23. The oscillating motion of probe 19 is in the directions signified by the arrows in FIG. 1. The force required to provide this motion of probe 19 is measured by means of load cell 24. Motor 22 can be affixed to probe adapter 20 instead of to mold member 11 as illustrated.

Figure 2:
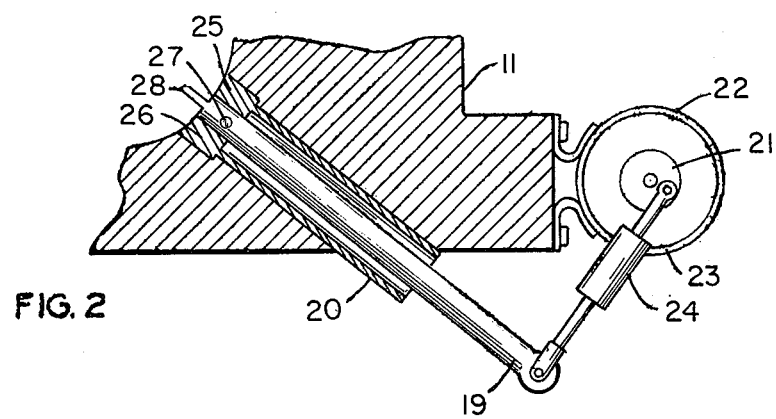
FIG. 2 is a fragmentary section view of the mold of FIG. 1 showing details of the modulus sensing apparatus.

FIG. 2 is an enlarged view of the modulus sensing apparatus shown in FIG. 1. From this view the pivoting action and pivotal location of probe 19 can be seen in greater detail. Probe adapter 20 has a shoulder section indicated by reference numeral 25. On the inside diameter of shoulder 25 is a circumferential groove adapted to retain O-ring 26. Probe 19 is thus located in a circumferential manner by O-ring 26. Axial restraint of probe 19 is afforded by pivot pin 27, the ends of which are anchored in mold member 11 and the body of which passes through a drilled passage in probe 19. The tip of probe 19 is fashioned as a paddle and is indicated by reference numeral 28.

Figure 3:
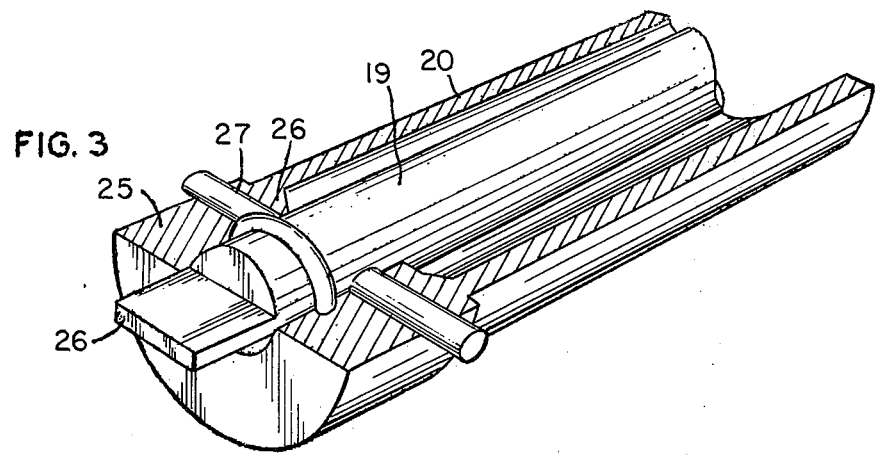
FIG. 3 is an enlarged view of the probe end of the modulus sensor.

Referring to FIG. 3 of the drawing, tip 28 of probe 19 is illustrated in an enlarged view. In the embodiment of the present invention illustrated in the instant drawings, probe tip 28 has dimensions such that the height of the tip is 0.5 inches and the width of the tip is approximately 0.375 inches. Although the illustrated embodiment of probe 19 comprises a paddle shaped tip 28, it is to be understood that numerous other configurations may be employed for the portion of the probe which penetrates the elastomeric material within the mold. Instead of a paddle shaped tip, one might employ a spherical tip, a conical tip or various other geometrical configurations. The configuration of the probe tip depends to some extent on the desired amount of penetration into the elastomeric article and the physical characteristics and cure properties of the elastomer used. Paddle shaped tip 28 of the illustrated embodiment has given satisfactory results as can be observed from the test results presented in FIG. 4 of the drawing.

FIG. 4 is a curve of rubber modulus vs. time obtained during curing of a rubber article using the apparatus hereinbefore described. The curing temperature employed in obtaining the data of FIG. 4 was 300°F. Paddle tip 28 was oscillated in an arc of 6.2° at a frequency of 10 cycles per minute. The energy required to oscillate probe 19 was measured by means of load cell 24. As the curing time increased, the energy required to oscillate probe 19 increased in the manner shown in the curve of FIG. 4. This energy is expressed in inch-pounds and is generically called "rubber modulus." Other units of measurement, of course, may be used since the critical value is merely that point on the curve which relates to optimum cure. Paddle tip 28 penetrated that portion of the rubber which is known as skim stock. The curve of FIG. 4, therefore, illustrates that the method and apparatus of the present invention can be successfully employed to monitor the modulus of an elastomeric material on a real time basis to determine optimum cure in a mold. Instead of testing a mere sample, the article itself is tested herein.

Numerous variations can be employed in accomplishing the results and the teachings of the present invention. For example, the modulus sensing probe may be introduced at virtually any desired location along the inside surface of the curing mold so long as it penetrates the curing elastomer at the desired location. In view of the variations in curing rate which may be encountered in the various sections of an article such as a tire, it may be desirable to employ a plurality of modulus sensors within a given mold. Where a plurality of sensors are employed, the optimum cure time may be considered to be a compromise derived from the average of not the optimum cure of each section, but some intermediate value.

Instead of the eccentric-driven oscillating sensor probe of the illustrated embodiment, one might employ sensors having different modes, frequencies, amplitudes and motions. A solenoid having a suitable stroke may be employed in place of motor 22 and eccentric 21, thus creating, if desired, a longitudinal vibration of probe 19. Furthermore, instead of the load cell or strain gauge method of measuring driving energy, one could employ many well-known alternative methods of energy measurement.

The readout of energy or modulus for obtaining the data of FIG. 4 was achieved by a continuous operation chart-type recorder. Where the mold is to be opened manually upon attainment of optimum cure, the operator simply observes the energy or modulus traces on the recorder and thereupon opens the mold when the chart value so indicates. The optimum modulus value for a given probe configuration, probe amplitude and probe frequency can be determined experimentally. Once established, however, this value becomes a constant.

Referring again to FIG. 1 of the drawing, probe 19 can be constructed of metal or any material which creates a suitable interface with the elastomer being cured and which is chemically non-reactive with that elastomer. Oscillation or vibration of probe 19 is not necessarily accomplished by mechanical drive means. Electrical oscillation may be employed by applying an alternating current to an induction coil, for example.

With reference again to FIG. 2 of the drawing, it will be observed that O-ring 26 serves a dual function. Besides providing circumferential piloting of probe 19, O-ring 26 also serves to prevent leakage of elastomeric material from the mold and loss of mold pressure. O-ring 26 can be fabricated from any deformable, resilient material which is impervious to the reaction of curing pressures, and is compatible with the elastomer being cured. The inside diameter of O-ring 26 is sized so as to provide a tight fit on the outside diameter of probe 19. Seal configurations other than the O-ring type may be employed, for example, a diaphragm type.

In the present invention there was determined a need for relatively low oscillation frequency in the probe in order to obtain superior results. It was found herein that, although considerable latitude is permissible in the choice of probe frequency, the order of magnitude is generally low, i.e., from about 1 to about 1000 cycles per minute. With the probe configuration illustrated in the drawing, when used on tire skim stock, the preferred frequency range is from about 1 to about 50 cycles per minute.

While this invention has been described with respect to the certain specific embodiments, it is not so limited and it is to be understood that variations and modifications thereof may be made without departing from the spirit of the following claims:

The embodiments of this invention in which an exclusive property or privelege is claimed are defined as follows:

1. In a method of curing a staple elastomeric article under pressure within a mold wherein said article comprises at least one thick section and at least one thinner section and undergoes changes in modulus as curing progresses, the improvement which comprises the steps of embedding a slender probe in a thick section of said article, the tip of said probe being in the interior of said section, oscillating said tip embedded probe transversely at a frequency of from about 1 to about 1000 cycles per minute about a pivot line substantially perpendicular to a longitudinal plane of the probe, measuring the force required to oscillate said probe as curing progresses, opening the mold at a determined force and removing a vendible article.

2. Apparatus for curing a pneumatic tire which comprises a tire curing mold and pressure means for confining the tire in the mold under pressure, a slender probe disposed in said mold the tip of which is adpated to penetrate the tire surface and terminate in the shoulder region thereof, drive means adapted to oscillate said probe transversely at a frequency within the range of about 1 to about 1000 cycles per minute about a pivot line substantially perpendicular to a longitudinal plane of the probe, and means for measuring the force required to oscillate said probe.

* * * * *